US012370819B2

(12) United States Patent
Yamasaki

(10) Patent No.: US 12,370,819 B2
(45) Date of Patent: Jul. 29, 2025

(54) INKJET RECORDING APPARATUS CAPABLE OF ADJUSTING HEIGHT OF INKJET HEAD IN SHORT TIME

(71) Applicant: KYOCERA Document Solutions Inc., Osaka (JP)

(72) Inventor: Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 153 days.

(21) Appl. No.: 18/517,617

(22) Filed: Nov. 22, 2023

(65) Prior Publication Data

US 2024/0174011 A1 May 30, 2024

(30) Foreign Application Priority Data

Nov. 30, 2022 (JP) ................................ 2022-191159

(51) Int. Cl.
*B41J 25/308* (2006.01)
*B41J 25/316* (2006.01)

(52) U.S. Cl.
CPC ......... *B41J 25/316* (2013.01); *B41J 25/3086* (2013.01)

(58) Field of Classification Search
CPC .... B41J 25/304; B41J 25/308; B41J 25/3082; B41J 25/3086; B41J 25/3088; B41J 25/316
See application file for complete search history.

(56) References Cited

U.S. PATENT DOCUMENTS

2016/0096385 A1* 4/2016 Matsuzaki ........... B41J 2/16511 347/8
2022/0288958 A1* 9/2022 Yamasaki .............. B41J 25/308
2023/0322004 A1* 10/2023 Tanaka ................... B41J 25/308

FOREIGN PATENT DOCUMENTS

JP 2013248887 A 12/2013

* cited by examiner

*Primary Examiner* — Scott A Richmond

(74) *Attorney, Agent, or Firm* — Alleman Hall & Tuttle LLP

(57) ABSTRACT

An inkjet recording apparatus includes a first adjustment portion and a second adjustment portion. The first adjustment portion adjusts a position of an inkjet head in a predetermined direction intersecting with an up-down direction. The second adjustment portion retains the first adjustment portion in a liftable manner and adjusts a position of the first adjustment portion in the up-down direction. The second adjustment portion includes a tilted member which has an upper surface tilted with respect to the predetermined direction and is slidable in the predetermined direction. The first adjustment portion includes a contact portion which protrudes downwardly and comes into contact with the upper surface of the tilted member.

4 Claims, 14 Drawing Sheets

INKJET RECORDING APPARATUS CAPABLE OF ADJUSTING HEIGHT OF INKJET HEAD IN SHORT TIME

INCORPORATION BY REFERENCE

This application is based upon and claims the benefit of priority from the corresponding Japanese Patent Application No. 2022-191159 filed on Nov. 30, 2022, the entire contents of which are incorporated herein by reference.

BACKGROUND

The present disclosure relates to an inkjet recording apparatus.

In an inkjet recording apparatus, there is a need to accurately position an inkjet head. In this regard, a technique for positioning an inkjet head has been discussed conventionally. For example, there is known an apparatus including: a taper hole portion which is provided on an inkjet nozzle unit side or frame side and is formed to have a larger diameter toward an opening; a first reference surface provided on the inkjet nozzle unit side or frame side; a taper pin portion which is provided on the frame side or inkjet nozzle unit side, is formed to have a smaller diameter toward a tip end, and engages with the taper hole portion; a second reference surface which is provided on the frame side or inkjet nozzle unit side and comes into contact with the first reference surface; and nozzle unit bias means for biasing an inkjet nozzle unit so as to press the first reference surface and the second reference surface.

SUMMARY

An inkjet recording apparatus according to the present disclosure includes a first adjustment portion and a second adjustment portion. The first adjustment portion adjusts a position of an inkjet head in a predetermined direction intersecting with an up-down direction. The second adjustment portion retains the first adjustment portion in a liftable manner and adjusts a position of the first adjustment portion in the up-down direction. The second adjustment portion includes a tilted member which has an upper surface tilted with respect to the predetermined direction and is slidable in the predetermined direction. The first adjustment portion includes a contact portion which protrudes downwardly and comes into contact with the upper surface of the tilted member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an inkjet recording apparatus 1 according to an embodiment of the present disclosure will be described with reference to the drawings.

Figure 1:
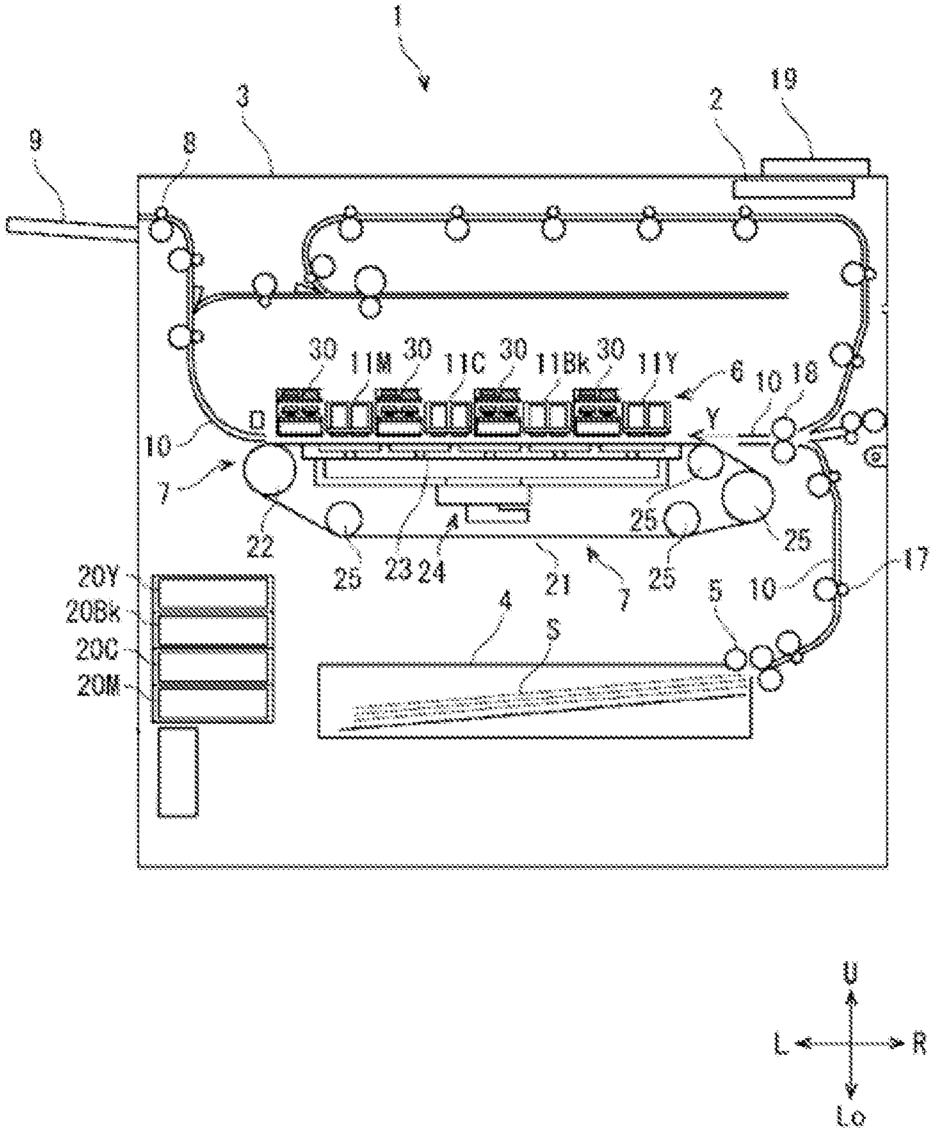
FIG. 1 is a front view schematically showing an inside of an inkjet recording apparatus according to an embodiment of the present disclosure.
Figure 2:
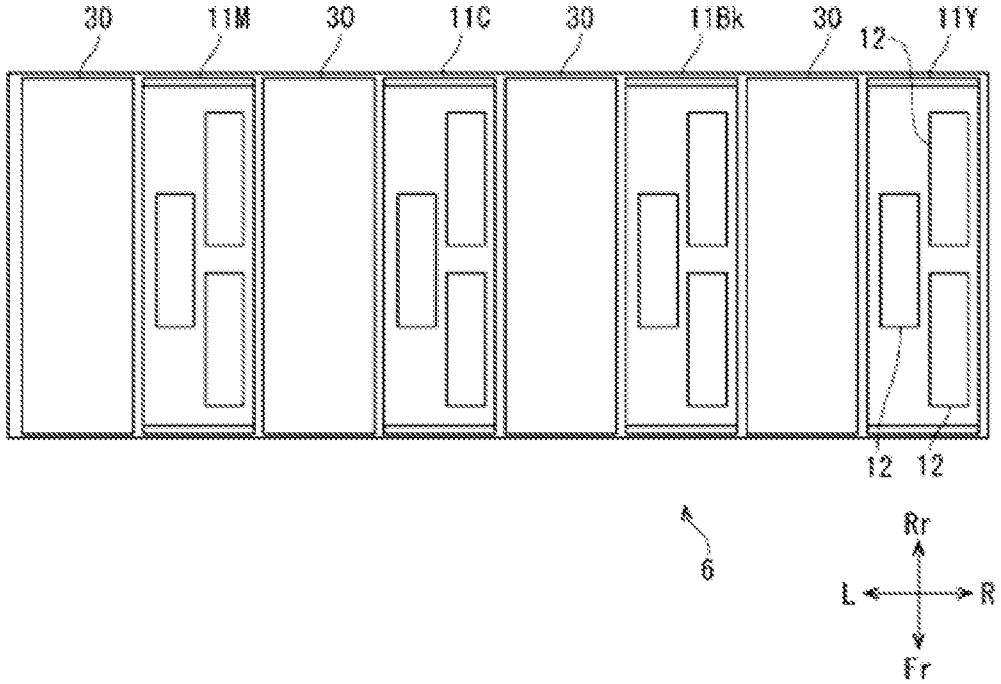
FIG. 2 is a plan view showing an imaging unit according to the embodiment of the present disclosure.
Figure 3:
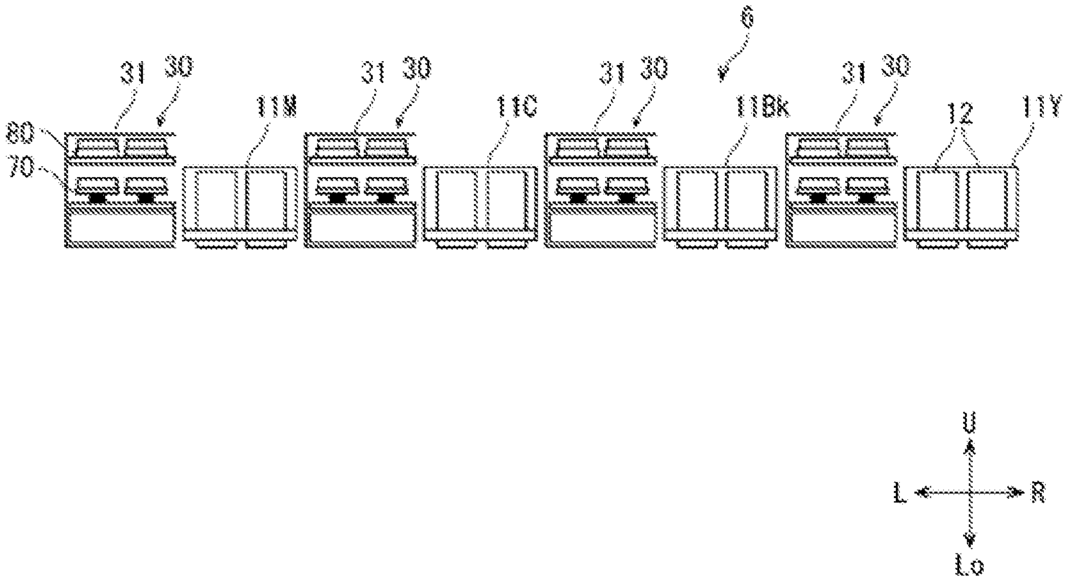
FIG. 3 is a cross-sectional view showing the imaging unit according to the embodiment of the present disclosure.
Figure 4:
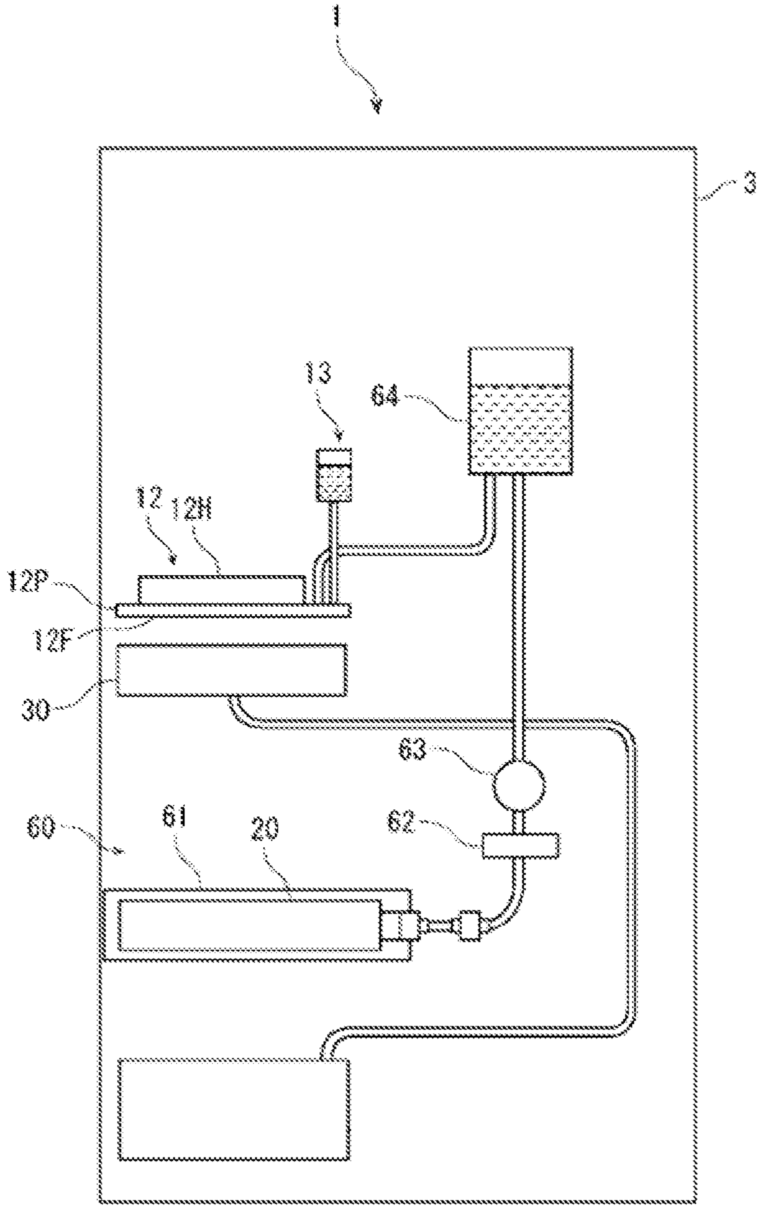
FIG. 4 is a diagram schematically showing an ink supply path according to the embodiment of the present disclosure.

First, an overall configuration of the inkjet recording apparatus 1 will be described. FIG. 1 is a front view schematically showing an inside of the inkjet recording apparatus 1. FIG. 2 is a plan view showing an imaging unit 6. FIG. 3 is a cross-sectional view showing the imaging unit 6. FIG. 4 is a diagram schematically showing an ink supply path 60. Hereinafter, descriptions will be given while a front side of a sheet in FIG. 1 is set as a front surface side (front side) of the inkjet recording apparatus 1 and a left-right direction is set using a direction seen from a front surface of the inkjet recording apparatus 1 as a reference. In the respective figures, U, Lo, L, R, Fr, and Rr respectively indicate up, down, left, right, front, and rear.

The inkjet recording apparatus 1 (see FIG. 1) includes a body housing 3 having a rectangular parallelepiped shape. A sheet feed cassette 4 which stores a sheet-type sheet S such as plain paper and coated paper and a sheet feed roller 5 which feeds the sheet S from the sheet feed cassette 4 are provided at a lower portion inside the body housing 3. A conveying unit 7 which causes the sheet S to be sucked and attached thereto and conveys it in a Y direction is provided above the sheet feed cassette 4. The imaging unit 6 which discharges ink to form an image is provided above the conveying unit 7. At an upper left portion inside the body housing 3, a discharge roller 8 which discharges the sheet S that has been formed with an image and a discharge tray 9 in which the discharged sheets S are to be stacked are provided.

A conveying path 10 that reaches the discharge roller 8 from the sheet feed roller 5 via a gap between the conveying unit 7 and the imaging unit 6 is provided inside the body housing 3. The conveying path 10 is mainly formed by plate-like members opposing each other with a gap for causing the sheet S to pass therethrough provided therebetween. A conveying roller 17 which nips and conveys the sheet S is provided on the conveying path 10. A registration roller 18 is provided on an upstream side of the imaging unit 6 in a conveying direction Y.

The conveying unit 7 includes an endless conveying belt 21, a support plate 23, and a suction portion 24. The conveying belt 21 has a large number of air holes (not shown) and is wound across drive rollers 25 and a driven roller 22. The support plate 23 has a large number of air holes, and an upper surface thereof is in contact with an inner surface of the conveying belt 21. The suction portion 24 sucks air via the air holes of the support plate 23 and the air holes of the conveying belt 21 to thus cause the sheet S to be sucked and attached to the conveying belt 21. By the drive rollers 25 being driven in a counterclockwise direction by a drive portion (not shown) including a motor and a reduction gear, the conveying belt 21 rotates in the counterclockwise direction, and the sheet S sucked and attached to the conveying belt 21 is conveyed in the Y direction.

The inkjet recording apparatus 1 includes the ink supply path 60 (see FIG. 4). FIG. 4 shows the ink supply path 60 corresponding to ink of one color, but since ink of four colors is used in the present embodiment, the ink supply paths 60 of four systems are provided. The inkjet recording apparatus 1 includes a container attachment portion 61 to which an ink container 20 is attached, a filter 62 which filters the ink, a pump 63 which sucks the ink from the ink container 20 via the filter 62, and a sub-tank 64 which retains the ink pumped out from the pump 63.

The imaging unit 6 includes head units 11Y, 11Bk, 11C, and 11M (collectively referred to as the head unit 11). The head unit 11 includes one or more inkjet heads 12, for example, three inkjet heads 12 arranged in a staggered pattern (see FIG. 2). Ink containers 20Y, 20Bk, 20C, and 20M (collectively referred to as the ink container 20) respectively filled with ink of yellow, black, cyan, and magenta are respectively connected to the head units 11Y, 11Bk, 11C, and 11M.

The inkjet head 12 includes a casing 12H formed in a rectangular parallelepiped shape having a front-rear direction as a longitudinal direction, a nozzle plate 12P provided at a bottom portion of the casing 12H, a socket (not shown) to which a pipe from the sub-tank 64 is connected, and a cleaning solution supply portion 13 which supplies a cleaning solution to a nozzle surface 12F. The nozzle plate 12P includes a large number of nozzles (not shown) arranged in the front-rear direction. The nozzle includes a branched flow path branched from a flow path leading to the sub-tank 64, and a discharge outlet provided on the nozzle surface 12F as a lower surface of the nozzle plate 12P. A vibration plate is provided on an inner wall of the branched flow path. The vibration plate is provided with a pressure element. As the pressure element, a piezoelectric element, an electrostatic actuator, a heater, or the like is used. The inkjet head 12 includes a drive circuit (not shown) which drives the pressure element.

A control portion 2 (see FIG. 1) includes a calculation portion and a storage portion (not shown). The calculation portion is, for example, a CPU (Central Processing Unit). The storage portion includes storage media such as a ROM (Read Only Memory), a RAM (Random Access Memory), and an EEPROM (Electrically Erasable Programmable Read Only Memory). The calculation portion reads and executes control programs stored in the storage portion to perform various types of processing. It is noted that the control portion 2 may alternatively be realized by an integrated circuit that does not use software.

A display operation portion 19 is provided at an upper portion of the body housing 3 (see FIG. 1). The display operation portion 19 includes a display panel, a touch panel stacked on the display panel, and a keypad (not shown). The control portion 2 causes a screen presenting an operation menu, a status, and the like of the inkjet recording apparatus 1 to be displayed on the display panel, and controls the respective portions of the inkjet recording apparatus 1 according to operations detected by the touch panel and the keypad.

Basic image forming operations of the inkjet recording apparatus 1 are as follows. As an image forming job is input to the inkjet recording apparatus 1 from the display operation portion 19, an external computer, or the like, the sheet feed roller 5 feeds the sheet S from the sheet feed cassette 4 to the conveying path 10, and the registration roller 18 that has stopped rotating corrects a skew of the sheet S. As the registration roller 18 feeds the sheet S to the conveying unit 7 at a predetermined timing, the conveying unit 7 causes the sheet S to be sucked and attached to the conveying belt 21 and conveys it in the Y direction. As the control portion 2 supplies raster-type image data to the drive circuit in sync with the conveyance of the sheet S, the drive circuit supplies a discharge signal corresponding to a gradation of the image data to the pressure element so that ink is discharged from the nozzles, and thus an image is formed on the sheet S. The discharge roller 8 discharges the sheet S formed with the image onto the discharge tray 9.

A maintenance apparatus 30 is provided at an immediate left (the downstream side of the conveying direction Y) of each head unit 11 for each head unit 11. It is noted that the maintenance apparatus 30 may alternatively be provided at an immediate right (the upstream side of the conveying direction Y) of each head unit 11.

The maintenance apparatus 30 includes a cap unit 70 including a cap (not shown) to be attached to the nozzle surface 12F, a wipe unit 80 including a wipe blade (not shown) which removes the ink that has remained on the nozzle surface 12F, and a housing 31 which houses the cap unit 70 and the wipe unit 80. The housing 31 is formed in a rectangular parallelepiped shape having the front-rear direction as the longitudinal direction, and an opening portion is provided on a right side thereof. The maintenance apparatus 30 includes a cap slide mechanism (not shown) which causes the cap unit 70 to slide in the left-right direction and a wipe slide mechanism (not shown) which causes the wipe unit 80 to slide in the left-right direction.

The inkjet recording apparatus 1 includes a lifting mechanism (not shown) which lifts and lowers the head unit 11. The lifting mechanism lifts and lowers the head unit 11 between an image forming position in the case of forming an image and an evacuation position higher than the image forming position. At the image forming position, the head unit 11 is positioned such that an interval between the conveying belt 21 and the nozzle surface 12F becomes a predetermined distance. At the evacuation position, a space that enables the cap unit 70 and the wipe unit 80 to move is formed between the conveying belt 21 and the nozzle surface 12F.

Incidentally, for maintaining high image quality for the sheets S having various thicknesses, there is a need to adjust a height of the inkjet head 12 according to the thickness of the sheet S. For adjusting the height, a stair-like member corresponding to a plurality of thicknesses may be provided between the inkjet head 12 and the sheet conveying portion. In that case, however, the adjustment takes time since the position of the stair-like member is changed after setting apart the inkjet head 12 and the sheet conveying portion from each other. In addition, there is a fear that the position of the inkjet head 12 in the horizontal direction will be deviated along with the adjustment of the height.

In contrast, as will be described below, the inkjet recording apparatus 1 according to the embodiment of the present disclosure is capable of adjusting the height of the inkjet head 12 in a short time.

Figure 5:
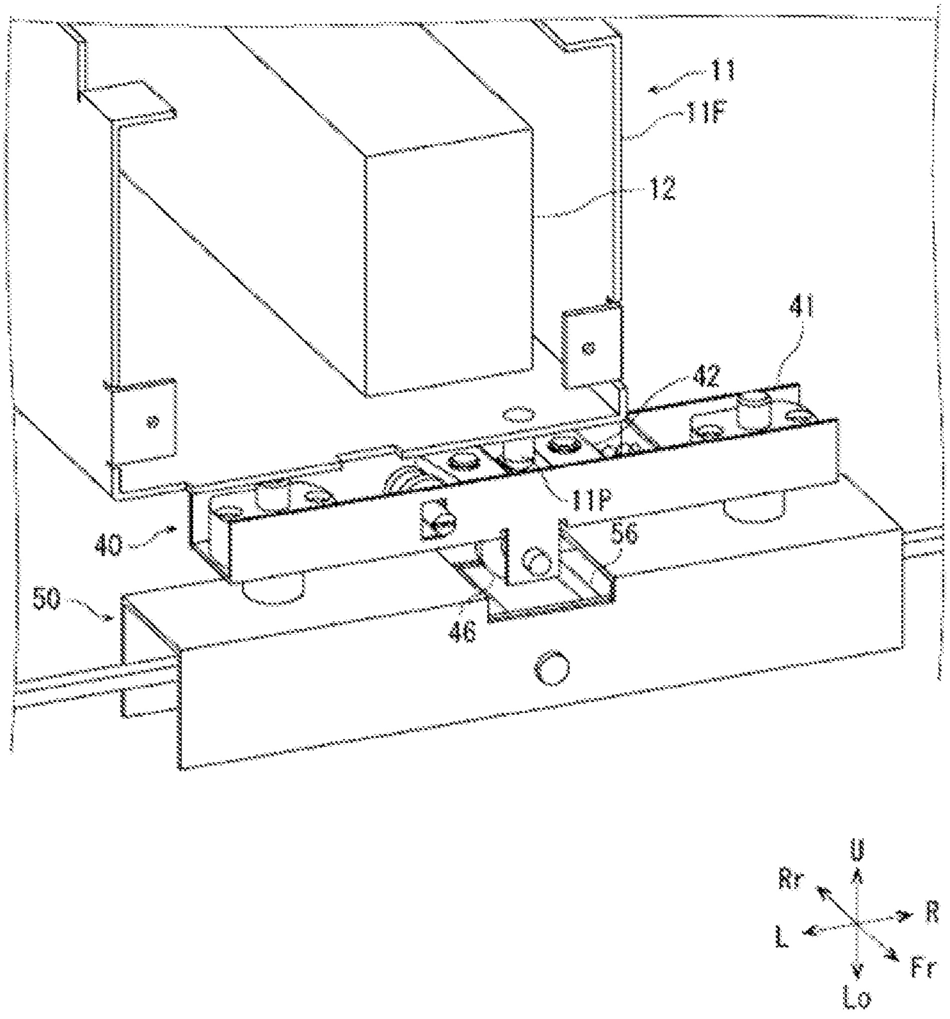
FIG. 5 is a perspective view showing a configuration of a front side of a head unit according to the embodiment of the present disclosure.
Figure 6:
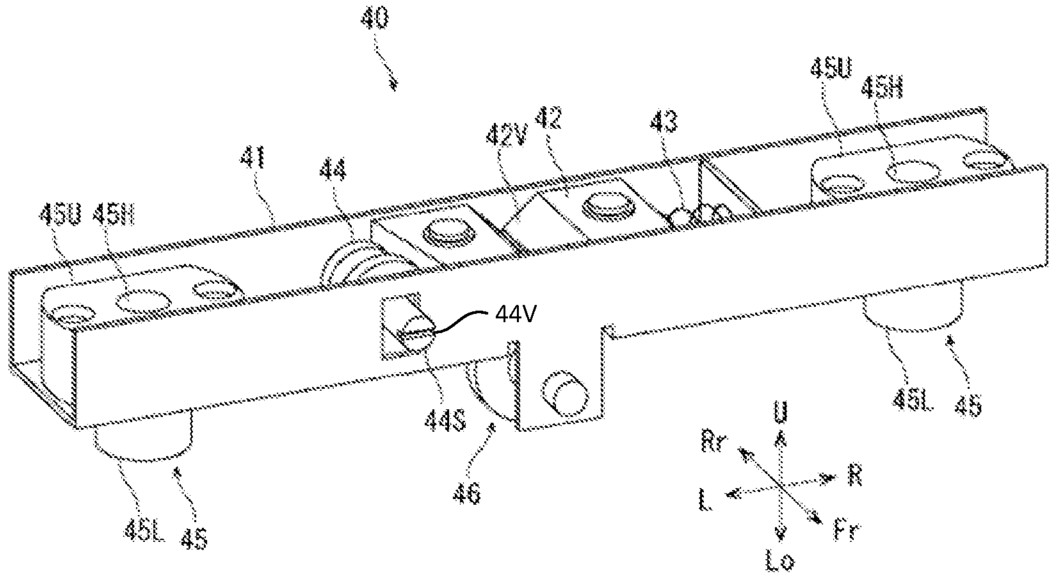
FIG. 6 is a perspective view showing a first adjustment portion according to the embodiment of the present disclosure.
Figure 7:
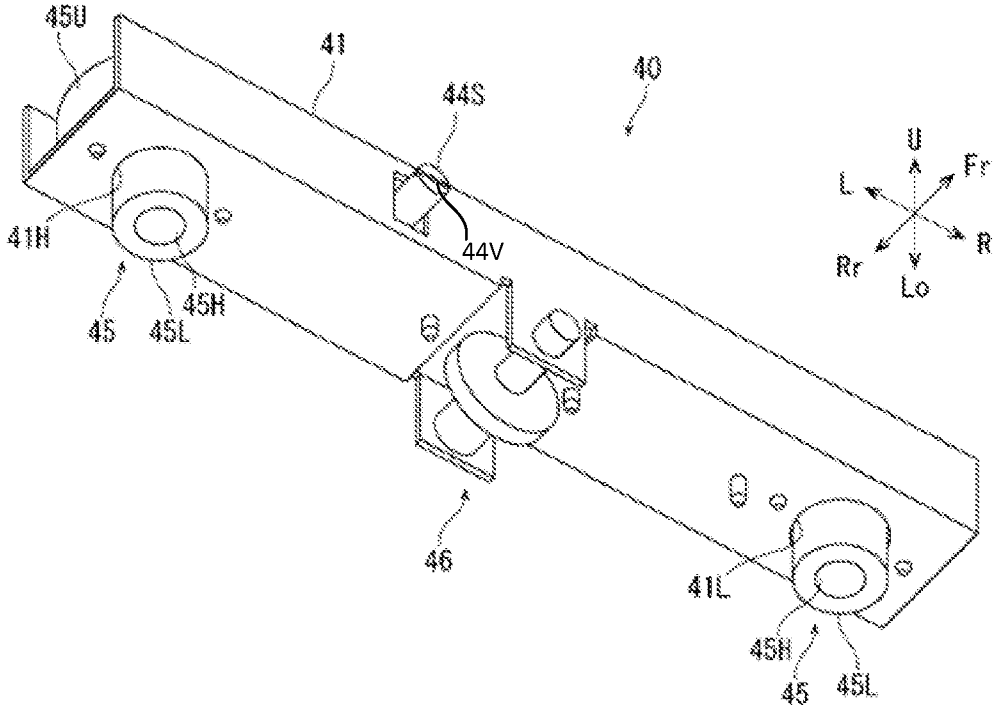
FIG. 7 is a perspective view showing the first adjustment portion according to the embodiment of the present disclosure.
Figure 8:
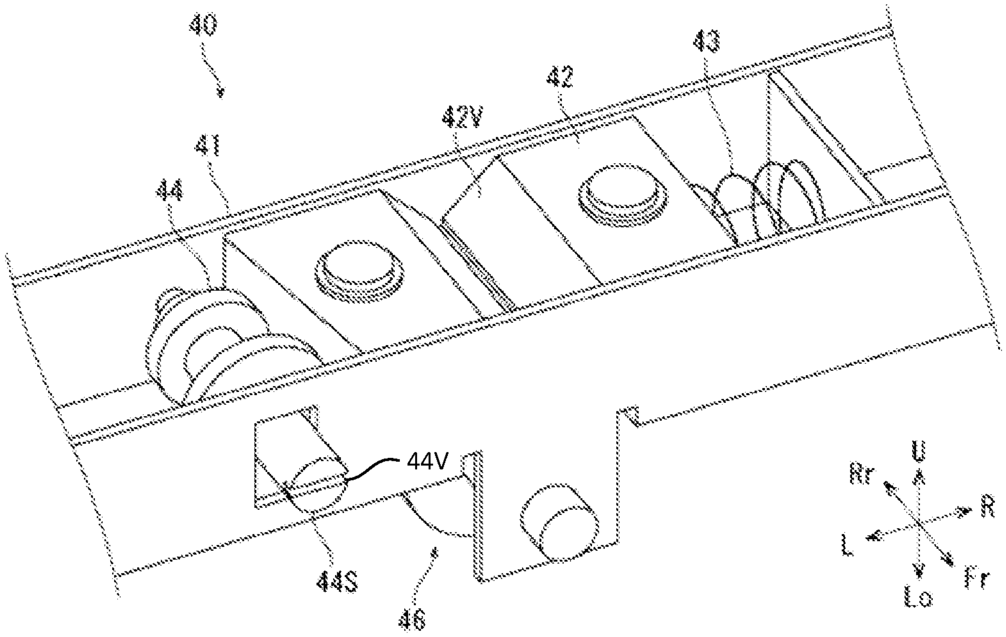
FIG. 8 is a perspective view showing a support member, a bias member, and a cam according to the embodiment of the present disclosure.
Figure 9:
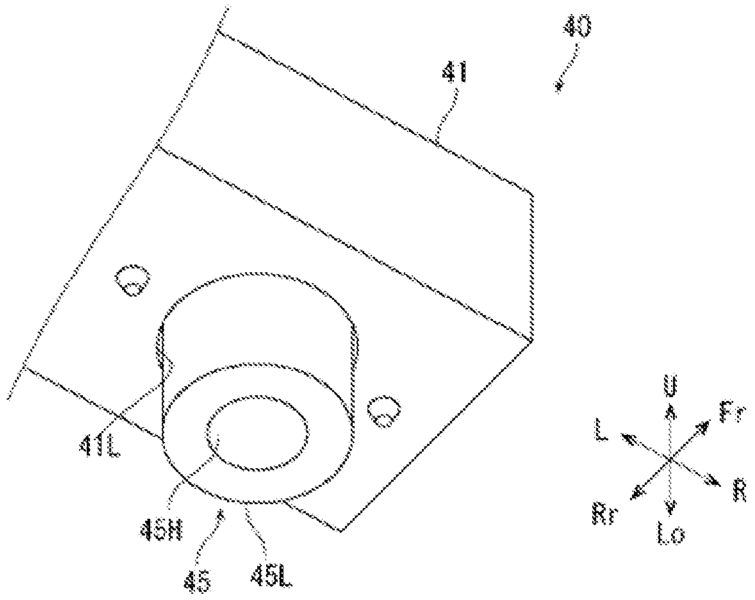
FIG. 9 is a perspective view showing a first fitting portion according to the embodiment of the present disclosure.
Figure 10:
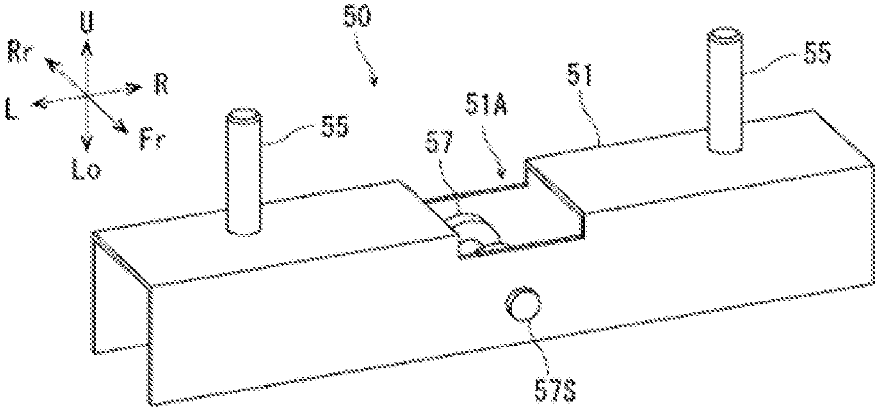
FIG. 10 is a perspective view showing a second adjustment portion (excluding a tilted member) according to the embodiment of the present disclosure.
Figure 11:
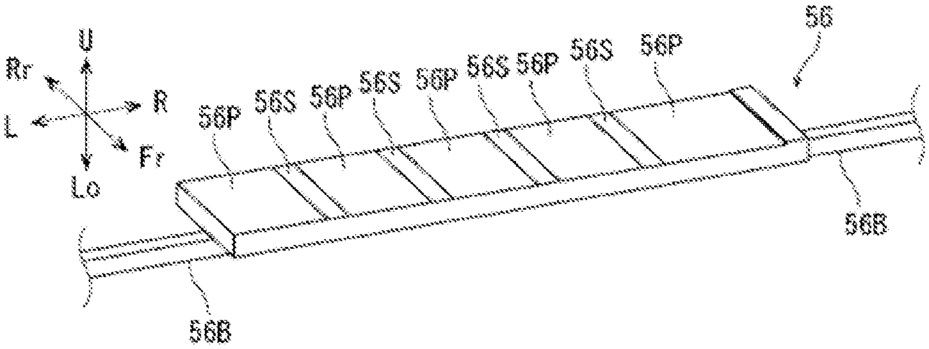
FIG. 11 is a perspective view showing the tilted member according to the embodiment of the present disclosure.
Figure 12:
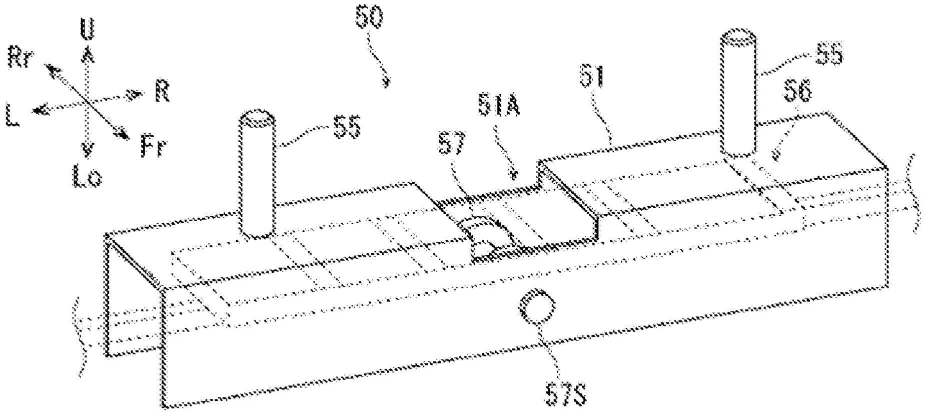
FIG. 12 is a perspective view showing a position of the tilted member in the second adjustment portion according to the embodiment of the present disclosure.
Figure 13:
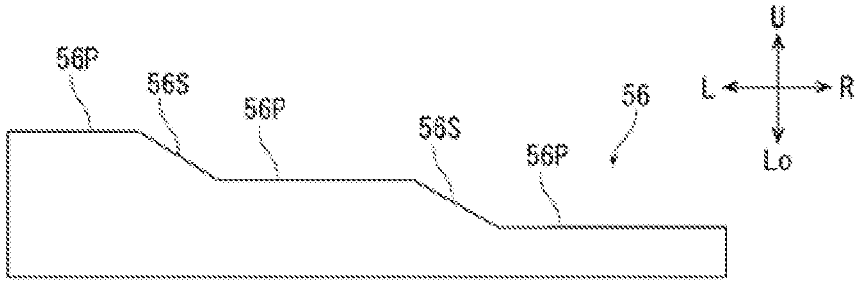
FIG. 13 is a front view schematically showing the tilted member according to the embodiment of the present disclosure.

Next, a mechanism for adjusting the position of the head unit 11 will be described. FIG. 5 is a perspective view showing a configuration of a front side of the head unit 11. FIG. 6 and FIG. 7 are each a perspective view showing a first adjustment portion 40. FIG. 8 is a perspective view showing a support member 42, a bias member 43, and a cam 44. FIG. 9 is a perspective view showing a first fitting portion 45. FIG. 10 is a perspective view showing a second adjustment portion 50 (excluding a tilted member 56). FIG. 11 is a perspective view showing the tilted member 56. FIG. 12 is a perspective view showing a position of the tilted member 56 in the second adjustment portion 50. FIG. 13 is a front view schematically showing the tilted member 56.

The inkjet recording apparatus 1 according to the present embodiment includes: the first adjustment portion 40 which adjusts the position of the inkjet head 12 in a predetermined direction intersecting with the up-down direction; and the second adjustment portion 50 which retains the first adjustment portion 40 in a liftable manner and adjusts a position of the first adjustment portion 40 in the up-down direction, in which the second adjustment portion 50 includes the tilted member 56 which has an upper surface tilted with respect to the predetermined direction and is slidable in the predetermined direction, and the first adjustment portion 40 includes a contact portion 46 which protrudes downwardly and comes into contact with the upper surface of the tilted member 56. The details are as follows.

The head unit 11 includes a frame body 11F which houses the inkjet head 12 (see FIG. 5). The frame body 11F is formed in a rectangular parallelepiped shape having the front-rear direction as the longitudinal direction. Three inkjet heads 12 are arranged in a staggered pattern in a single frame body 11F. A rear end portion of the frame body 11F is supported by the body housing 3 and is pivotable about a shaft having the up-down direction as an axial direction (not shown). An opening portion (not shown) from which the nozzle surface 12F is exposed is provided at a bottom portion of the frame body 11F.

[First Adjustment Portion]

The first adjustment portion 40 (see FIG. 6 to FIG. 9) includes a body portion 41, the support member 42, the bias member 43, the cam 44, the first fitting portions 45, and the contact portion 46. The body portion 41 is formed in a rectangular parallelepiped shape having the left-right direction as the longitudinal direction, and portions thereof corresponding to an upper surface and both left and right end surfaces of the rectangular parallelepiped are opened. A front end portion of the frame body 11F is supported by the support member 42. The support member 42 is a block-type member. On an upper surface of the support member 42, a groove 42V which has the front-rear direction as the longitudinal direction and has a V-shaped cross section is provided. A convex portion 11P that protrudes downwardly is provided at a front end portion of the bottom portion of the frame body 11F. The convex portion 11P is arranged inside the groove 42V of the support member 42. The support member 42 is arranged inside the body portion 41 and is retained while being slidable in the left-right direction.

On the right side of the support member 42, the bias member 43 which biases the support member 42 toward the left side is provided. The bias member 43 is, for example, a compression coil spring in which the left-right direction is a compression direction. A right end portion of the bias member 43 is fixed to the body portion 41. A left end portion of the bias member 43 is in contact with the support member 42. On the left side of the support member 42, the cam 44 which presses the support member 42 toward the right side is provided. The cam 44 is, for example, an eccentric cam which rotates about a shaft having the front-rear direction as the axial direction. A shaft 44S of the cam 44 protrudes toward the front direction from the body portion 41. At a front end portion of the shaft 44S, a groove 44V into which a tip end portion of a tool such as a driver is inserted is provided. The contact portion 46 which protrudes downwardly is provided at the bottom portion of the first adjustment portion 40. The contact portion 46 is a roller that rotates about a shaft having the front-rear direction as the axial direction.

The first fitting portions 45 are respectively provided at both the left and right end portions of the body portion 41. The first fitting portion 45 includes a cylindrical lower portion 45L and an upper portion 45U having a larger width in the left-right direction than the lower portion 45L. The first fitting portion 45 is provided with a hole 45H penetrating through the upper portion 45U and the lower portion 45L in the up-down direction. At the left end portion of the bottom portion of the body portion 41, a hole 41H into which the lower portion 45L of the left-side first fitting portion 45 is fit is provided. At the right end portion of the bottom portion of the body portion 41, a long hole 41L into which the lower portion 45L of the right-side first fitting portion 45 is inserted is provided. By fastening the upper portion 45U of the first fitting portion 45 to the bottom portion of the body portion 41 by a screw, the first fitting portion 45 is fixed to the body portion 41. The long hole 41L is formed to be slightly longer than the lower portion 45L of the first fitting portion 45 in the left-right direction. Consequently, the right-side first fitting portion 45 can be fixed while being positionally deviated in the left-right direction, and the first fitting portion 45 and a second fitting portion 55 are fixed while being pressed against each other in the left-right direction. Thus, a positional deviation of the first adjustment portion 40 with respect to the second adjustment portion 50 is suppressed.

[Second Adjustment Portion]

The second adjustment portion 50 (see FIG. 10 to FIG. 14) includes a body portion 51, the second fitting portions 55, and the tilted member 56. The body portion 51 is formed in a rectangular parallelepiped shape having the left-right direction as the longitudinal direction, and portions thereof corresponding to a lower surface and both left and right end surfaces of the rectangular parallelepiped are opened. An opening portion 51A is provided at a center portion of the upper surface of the body portion 51 in the left-right direction. The tilted member 56 is a plate-like member having the left-right direction as the longitudinal direction. At both the left and right end portions of the tilted member 56, support bars 56B having the left-right direction as the longitudinal direction are provided, respectively. The support bars 56B are supported by the body housing 3 while being slidable in the left-right direction.

The upper surface of the tilted member 56 is tilted so that the left side becomes higher as a whole. Further, the tilted member 56 includes a parallel surface 56P formed to be parallel (horizontal) to the left-right direction at a plurality of positions on the upper surface in the predetermined direction. In other words, on the upper surface of the tilted member 56, tilted surfaces 56S that are tilted so that the left side becomes higher and the parallel surfaces 56P are provided alternately in the left-right direction. Heights of the plurality of parallel surfaces 56P are set according to the thicknesses of the sheets S. The contact portion 46 of the first adjustment portion 40 comes into contact with the upper surface of the tilted member 56. By causing the tilted member 56 to slide such that the contact portion 46 comes into contact with the parallel surface 56P corresponding to the thickness of the sheet S, a distance between the inkjet head 12 and the sheet S is maintained at a predetermined distance.

A pinion 57 which rotates about a shaft having the front-rear direction as the axial direction is provided below the tilted member 56. A shaft 57S of the pinion 57 is supported by the body portion 51. A rack (not shown) that intermeshes with the pinion 57 is provided on the lower surface of the tilted member 56.

The second fitting portions 55 are respectively provided at two positions respectively corresponding to the left- and right-side first fitting portions 45. The second fitting portion 55 is a bar-type member that fits into the hole 45H of the first fitting portion 45. The first fitting portion 45 is slidable in the up-down direction with respect to the second fitting portion 55. Consequently, the first adjustment portion 40 can be lifted and lowered with respect to the second adjustment portion 50.

The position of the inkjet head 12 in the left-right direction is adjusted using the first adjustment portion 40. The position of the support member 42 in the left-right direction is adjusted by causing the cam 44 to rotate. The height of the inkjet head 12 is adjusted by changing the height of the first adjustment portion 40 using the second adjustment portion 50. The pinion 57 is driven by a drive portion (not shown) such as a motor. The control portion 2 controls the drive portion such that the contact portion 46 comes into contact with the parallel surface 56P corresponding to the thickness of the sheet S.

The inkjet recording apparatus 1 according to the present embodiment described above includes: the first adjustment portion 40 which adjusts the position of the inkjet head 12 in the predetermined direction intersecting with the up-down direction; and the second adjustment portion 50 which retains the first adjustment portion 40 in a liftable manner and adjusts the position of the first adjustment portion 40 in the up-down direction, in which the second adjustment portion 50 includes the tilted member 56 which has the upper surface tilted with respect to the predetermined direction and is slidable in the predetermined direction, and the first adjustment portion 40 includes the contact portion 46 which protrudes downwardly and comes into contact with the upper surface of the tilted member 56. With this configuration, the height of the inkjet head 12 can be adjusted by merely causing the tilted member 56 to slide, and thus there is no need to set the inkjet head 12 apart from the tilted member 56 for adjusting the height. Thus, according to the present embodiment, the height of the inkjet head 12 can be adjusted in a short time.

Further, according to the inkjet recording apparatus 1 of the present embodiment, the tilted member 56 includes the parallel surfaces 56P formed to be parallel to the predetermined direction at the plurality of positions on the upper surface in the predetermined direction. With this configuration, the height of the inkjet head 12 can be easily adjusted in a plurality of steps respectively corresponding to the thicknesses of the sheets S. Moreover, by causing the contact portion 46 to come into contact with the parallel surface 56P, it becomes difficult for the tilted member 56 and the contact portion 46 to be deviated in the left-right direction, and thus the accuracy of the height of the inkjet head 12 can be maintained high.

Further, according to the inkjet recording apparatus 1 of the present embodiment, the contact portion 46 rotates along with the slide of the tilted member 56. With this configuration, the height of the inkjet head 12 can be adjusted smoothly.

Furthermore, according to the inkjet recording apparatus 1 of the present embodiment, the first adjustment portion 40 includes the first fitting portion 45 at two positions in the predetermined direction, the second adjustment portion 50 includes the second fitting portion 55 which fits with the first fitting portion 45 and with which the first fitting portion 45 is slidable in the up-down direction, and the first fitting portion 45 at either one of the two positions in the predetermined direction or the second fitting portion 55 can be fixed while being positionally deviated in the predetermined direction. With this configuration, the first fitting portion 45 and the second fitting portion 55 are fixed while being pressed against each other in the left-right direction, and thus the positional deviation of the first adjustment portion 40 with respect to the second adjustment portion 50 is suppressed.

The embodiment described above may be modified as follows.

Figure 14:
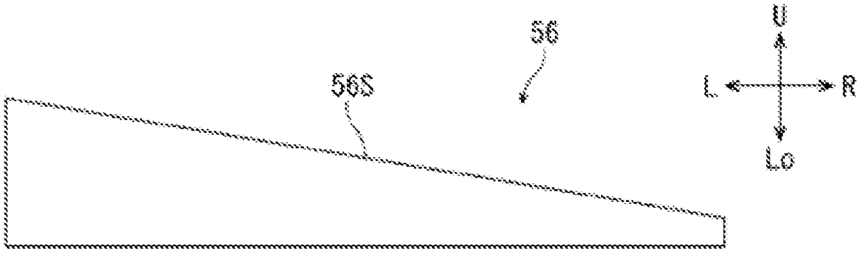
FIG. 14 is a front view schematically showing the tilted member according to a modified example of the embodiment of the present disclosure.

FIG. 14 is a front view schematically showing the tilted member 56 according to a modified example of the embodiment described above. The embodiment described above has shown the example where the tilted surfaces 56S and the parallel surfaces 56P are provided alternately on the upper surface of the tilted member 56. However, as shown in FIG. 14, only a continuous tilted surface 56S may alternatively be provided. With this configuration, the height of the inkjet head 12 can be adjusted steplessly.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inkjet recording apparatus, comprising:

a first adjustment portion which adjusts a position of an inkjet head in a predetermined direction intersecting with an up-down direction; and a second adjustment portion which retains the first adjustment portion in a liftable manner and adjusts a position of the first adjustment portion in the up-down direction, wherein the second adjustment portion includes a tilted member which has an upper surface tilted with respect to the predetermined direction and is slidable in the predetermined direction, and the first adjustment portion includes a contact portion which protrudes downwardly and comes into contact with the upper surface of the tilted member.

2. The inkjet recording apparatus according to claim 1, wherein the tilted member includes a parallel surface formed to be parallel to the predetermined direction at a plurality of positions on the upper surface in the predetermined direction.

3. The inkjet recording apparatus according to claim 1, wherein the contact portion rotates along with slide of the tilted member.

4. The inkjet recording apparatus according to claim 1, wherein the first adjustment portion includes a first fitting portion at two positions in the predetermined direction, the second adjustment portion includes a second fitting portion which fits with the first fitting portion and with which the first fitting portion is slidable in the up-down direction, and the first fitting portion at either one of the two positions in the predetermined direction or the second fitting portion can be fixed while being positionally deviated in the predetermined direction.

* * * * *